(12) United States Patent
Tateishi

(10) Patent No.: US 10,694,813 B2
(45) Date of Patent: Jun. 30, 2020

(54) SHOE SOLE MEMBER

(71) Applicant: ASICS CORPORATION, Kobe-shi (JP)

(72) Inventor: Junichiro Tateishi, Kobe (JP)

(73) Assignee: ASICS CORPORATION (JP)

( * ) Notice: Subject to any disclaimer, the term of this patent is extended or adjusted under 35 U.S.C. 154(b) by 0 days.

(21) Appl. No.: 14/787,235

(22) PCT Filed: May 1, 2013

(86) PCT No.: PCT/JP2013/062730
§ 371 (c)(1),
(2) Date: Oct. 26, 2015

(87) PCT Pub. No.: WO2014/178137
PCT Pub. Date: Nov. 6, 2014

(65) Prior Publication Data
US 2016/0113353 A1    Apr. 28, 2016

(51) Int. Cl.
*A43B 13/18*     (2006.01)
*A43B 13/04*     (2006.01)

(52) U.S. Cl.
CPC ............ *A43B 13/187* (2013.01); *A43B 13/04* (2013.01)

(58) Field of Classification Search
CPC .............................. A43B 13/187; A43B 13/04
See application file for complete search history.

(56) References Cited

U.S. PATENT DOCUMENTS

| | | | |
|---|---|---|---|
| 2,999,788 A * | 9/1961 | Winthrop | ................. D01D 5/04 162/146 |
| 3,634,184 A * | 1/1972 | Wang | ...................... B32B 27/00 442/64 |
| 3,675,346 A | 7/1972 | Miyachi et al. | |
| 4,469,740 A * | 9/1984 | Bailly | ................. A43B 17/102 156/148 |
| 5,718,063 A | 2/1998 | Yamashita et al. | |
| D416,381 S | 11/1999 | Senda et al. | |
| 6,199,302 B1 | 3/2001 | Kayano | |
| 6,212,795 B1 | 4/2001 | Nakabe et al. | |
| 6,255,235 B1 | 7/2001 | Hiraoka et al. | |
| 6,438,870 B2 | 8/2002 | Nasako et al. | |
| 6,467,191 B2 | 10/2002 | Hayashi et al. | |
| 6,467,197 B1 | 10/2002 | Mitsui et al. | |

(Continued)

FOREIGN PATENT DOCUMENTS

| | | |
|---|---|---|
| EP | 2045287 A1 | 4/2009 |
| JP | S59-177305 U | 11/1984 |

(Continued)

OTHER PUBLICATIONS

Extended European Search Report issued in European Patent Application No. 13883665.5-1655, dated Oct. 26, 2016.

(Continued)

*Primary Examiner* — Victor S Chang
(74) *Attorney, Agent, or Firm* — Katten Muchin Rosenman LLP

(57) ABSTRACT

The invention aims to provide a shoe sole member capable of achieving comfort when using shoes and exhibiting excellent shape-recovering properties after using the shoes. Provided is a shoe sole member formed using a polymer foam, and the polymer foam contains fibers dispersed therein.

18 Claims, 1 Drawing Sheet

(56) References Cited

U.S. PATENT DOCUMENTS

| | | |
|---|---|---|
| 6,516,539 B2 | 2/2003 | Nishiwaki et al. |
| 6,562,271 B2 | 5/2003 | Hiraoka et al. |
| 6,647,646 B2 | 11/2003 | Mitsui et al. |
| 6,685,011 B2 | 2/2004 | Nishiwaki et al. |
| 6,763,615 B2 | 7/2004 | Mitsui et al. |
| D495,860 S | 9/2004 | Kubo et al. |
| D496,148 S | 9/2004 | Kayano et al. |
| D501,713 S | 2/2005 | Kayano et al. |
| D501,987 S | 2/2005 | Kubo et al. |
| D509,351 S | 9/2005 | Kayano et al. |
| D512,208 S | 12/2005 | Kubo et al. |
| D512,818 S | 12/2005 | Mitani et al. |
| D512,819 S | 12/2005 | Usuki et al. |
| D512,827 S | 12/2005 | Usuki et al. |
| D512,828 S | 12/2005 | Kubo et al. |
| D513,115 S | 12/2005 | Kayano et al. |
| D514,286 S | 2/2006 | Kayano et al. |
| D520,732 S | 5/2006 | Mitani et al. |
| D522,229 S | 6/2006 | Kubo et al. |
| D542,522 S | 5/2007 | Fujita et al. |
| D552,833 S | 10/2007 | Yamashita et al. |
| D553,846 S | 10/2007 | Kayano et al. |
| 7,322,131 B2 | 1/2008 | Yamashita et al. |
| D561,434 S | 2/2008 | Fujita et al. |
| D561,442 S | 2/2008 | Kayano et al. |
| D571,086 S | 6/2008 | Yamashita et al. |
| D571,090 S | 6/2008 | Fujita et al. |
| D575,486 S | 8/2008 | Yamashita et al. |
| D582,658 S | 12/2008 | Fujita et al. |
| 7,779,558 B2 | 8/2010 | Nishiwaki et al. |
| 7,877,899 B2 | 2/2011 | Nishiwaki et al. |
| 7,987,618 B2 | 8/2011 | Nishiwaki et al. |
| 8,008,363 B2 | 8/2011 | Mori et al. |
| D650,566 S | 12/2011 | Yamashita et al. |
| 8,074,377 B2 | 12/2011 | Nishiwaki et al. |
| 8,112,909 B2 | 2/2012 | Kubo et al. |
| 8,418,379 B2 | 4/2013 | Nishiwaki et al. |
| 8,453,344 B2 | 6/2013 | Nishiwaki et al. |
| 8,461,222 B2 | 6/2013 | Mori et al. |
| 8,544,190 B2 | 10/2013 | Nishiwaki et al. |
| D734,927 S | 7/2015 | Ando et al. |
| D734,928 S | 7/2015 | Ando et al. |
| 9,089,185 B2 | 7/2015 | Nishiwaki et al. |
| 2008/0083140 A1* | 4/2008 | Ellis ................. A42B 3/064 36/140 |
| 2011/0197468 A1 | 8/2011 | Kubo et al. |
| 2012/0216422 A1 | 8/2012 | Ikezawa et al. |
| 2015/0082668 A1 | 3/2015 | Nonogawa et al. |
| 2015/0135558 A1 | 5/2015 | Inomata et al. |
| 2015/0143723 A1 | 5/2015 | Tateishi et al. |
| 2015/0181975 A1 | 7/2015 | Otsuka et al. |
| 2015/0250260 A1 | 9/2015 | Bessho et al. |
| 2015/0282559 A1 | 10/2015 | Nishiwaki et al. |
| 2016/0015122 A1 | 1/2016 | Nishivvaki et al. |
| 2016/0113354 A1 | 4/2016 | Tateishi |
| 2016/0242498 A1 | 8/2016 | Sakamoto et al. |
| 2016/0255911 A1 | 9/2016 | Fujita et al. |
| 2016/0302523 A1 | 10/2016 | Fujita et al. |

FOREIGN PATENT DOCUMENTS

| | | |
|---|---|---|
| JP | S63-89547 A | 4/1988 |
| JP | H09-285307 A | 11/1997 |
| JP | H11-206406 A | 8/1999 |

OTHER PUBLICATIONS

English Translation of International Search Report issued in PCT/JP2013/062730 dated May 28, 2013.

* cited by examiner

# SHOE SOLE MEMBER

RELATED APPLICATION

This patent application is a national stage application, filed under 35 U.S.C. § 371, of International Application No. PCT/JP2013/062730 filed on May 1, 2013, the contents of which are hereby fully incorporated by reference.

FIELD

The present invention relates to a shoe sole member. More specifically, the present invention relates to a shoe sole member that is used, for example, as an inner sole, a sock liner, a midsole, or an outer sole.

BACKGROUND

Conventionally, polymer foams formed by foaming a composition whose main component is a polymer such as resins and rubbers are used for various applications because of their excellent cushioning properties, and are widely used also for sporting goods. Sports shoes used for various competitions are composed of various members. For example, a shoe sole is composed of shoe sole members such as an outer sole, a midsole, and an inner sole. Such a shoe sole member is formed using a polymer foam whose main component is a crosslinked resin since it is required to have properties such as light weight, mechanical strength to suppress deformation due to a long-term use and to withstand severe use conditions, and shock absorbing properties.

As polymer foams used for shoe sole members, polymer foams formed by crosslinking and foaming polyurethane, natural rubber, or ethylene-vinyl acetate copolymer are conventionally known. Particularly, a polymer foam formed by crosslinking and foaming a polymer composition whose main component is ethylene-vinyl acetate copolymer is suitable for use as a shoe sole member from the viewpoint of durability and cost (see Patent Literature 1 below).

However, such a conventional polymer foam has a problem that, when compressive strain is applied for a long time, it is difficult to recover its shape as before, which phenomenon is significant particularly when the polymer foam is highly foamed. Therefore, there is a fear that the compressive deformation of the conventional shoe sole member applied in use does not sufficiently recover after use, in the case where a polymer foam that is highly foamed more than conventional foaming is employed as a forming material in efforts to obtain lightweight properties. A shoe sole member having excellent recovering properties from the compressive deformation can be obtained generally by employing a foam product formed using a resin having high rigidity as a forming material. However, the hardness of the foam product formed using a resin having high rigidity tends to increase beyond a necessary hardness as a shoe sole member, as compared to a foam product formed using a soft resin having low rigidity, which makes it difficult to sufficiently give comfort when using shoes.

That is, the conventional shoe sole member has a problem that excellent shape-recovering properties after using the shoes are difficult to achieve, in order to achieve comfort when using shoes.

CITATION LIST

Patent Literature

Patent Literature 1: JP H11-206406 A

SUMMARY

Technical Problem

In order to solve the aforementioned problem, it is an object of the present invention to provide a shoe sole member capable of achieving comfort when using shoes and exhibiting excellent shape-recovering properties after using the shoes.

Solution to Problem

As a result of diligent studies in order to solve the aforementioned problem, the inventor has found that properties such as compression set can be significantly improved by dispersing fibers in a polymer foam without excessively increasing the hardness of the polymer foam. Thus, the present invention has been accomplished. That is, in order to solve the aforementioned problem, the present invention relating to a shoe sole member is characterized in that the shoe sole member is partially or entirely formed using a polymer foam that is formed by foaming a polymer composition, and the polymer foam contains fibers dispersed therein.

Advantageous Effects of Invention

Shoe sole members undergo compressive deformation due to the weight of a wearer when using shoes. In the polymer foam used for the shoe sole member of the present invention, fibers are dispersed, and therefore stresses such as bending stress and tensile stress are allowed to act on the fibers upon the compressive deformation of the polymer foam. Accordingly, the recovery force of the fibers against the bending stress and the tensile strength of the fibers against the tensile stress can be utilized for recovering the shape of the polymer foam after using the shoes.

Thus, the present invention can give comfort during use to the shoe sole member formed using the polymer foam and excellent recovering properties after the use from deformation applied during the use.

DESCRIPTION OF EMBODIMENTS

Figure 1:
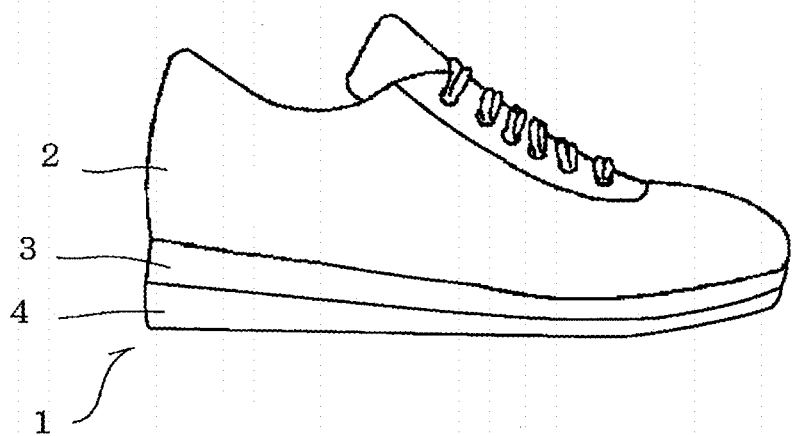
FIG. 1 is a substantial side view showing an aspect of a shoe sole member.

Hereinafter, embodiments of a shoe sole member of the present invention are described, for example. FIG. 1 shows a shoe formed using the shoe sole member of this embodiment. A shoe 1 has an upper material 2 and shoe sole members 3 and 4. The shoe 1 has a midsole 3 and an outer sole 4 as shoe sole members. The shoe sole members are formed using a polymer foam in which fibers are dispersed. The shoe sole members of this embodiment, for example, can be formed using the polymer foam having a specific gravity of not more than 0.15 and a compression set of not more than 40%.

The polymer foam in this embodiment has a specific gravity of not more than 0.15, in order to give excellent lightweight properties to the shoe sole members. The polymer foam preferably has a specific gravity of at least 0.01, more preferably at least 0.05. The specific gravity of the polymer foam means a value measured by "underwater displacement" prescribed in JIS K7112 as the method A under a temperature condition of 23° C. The specific gravity can be measured using a hydrometer having a mechanism to prevent floating of samples, and can be measured, for example, using a commercially available hydrometer from Alfa Mirage Co., Ltd., as a high-precision electronic hydrometer.

If the shoe sole members are formed using a polymer foam having an excessively low hardness, the foot comfort of shoes including the shoe sole members may possibly be reduced. Therefore, the Asker C hardness of the polymer foam is preferably at least 10 and not more than 80, more preferably at least 20 and not more than 70. The Asker C hardness of the polymer foam means an instantaneous value obtained by performing a spring hardness test prescribed in JIS K7312 as the type C at 23° C.

In this embodiment, the compression set of the polymer foam is not more than 40%, in order to allow the shoe sole members subjected to compressive deformation when using shoes to easily recover after using the shoes to the state before the use. Since it is not easy to completely eliminate the compression set of the polymer foam, the compression set of the polymer foam is preferably at least 1%, in order to facilitate the production of the shoe sole members. The compression set herein means a value measured based on the method A in ASTM D395 (constant load test), and is a value obtained by applying a pressure of 0.59 MPa to a measurement sample for 22 hours under a temperature condition of 23° C., and measuring the thickness of the measurement sample after a lapse of 24 hours after the measurement sample is released from the pressure.

The polymer composition constituting the polymer foam may be crosslinked or uncrosslinked. However, in order to exhibit such properties of the compression set as mentioned above, it is preferable that the polymer composition constituting the polymer foam is crosslinked. In this embodiment, the base polymer that is the main component of the polymer composition is not specifically limited, and may be the same as polymers conventionally used for forming shoe sole members.

Examples of the base polymer include polyethylene, polypropylene, ethylene-propylene copolymer, propylene-1-hexene copolymer, propylene-4-methyl-1-pentene copolymer, propylene-1-butene copolymer, ethylene-1-hexene copolymer, ethylene-4-methyl-pentene copolymer, ethylene-1-butene copolymer, 1-butene-1-hexene copolymer, 1-butene-4-methyl-pentene, ethylene-methacrylic acid copolymer, ethylene-methyl methacrylate copolymer, ethylene-ethyl methacrylate copolymer, ethylene-butyl methacrylate copolymer, ethylene-methyl acrylate copolymer, ethylene-ethyl acrylate copolymer, ethylene-butyl acrylate copolymer, propylene-methacrylic acid copolymer, propylene-methyl methacrylate copolymer, propylene-ethyl methacrylate copolymer, propylene-butyl methacrylate copolymer, propylene-methyl acrylate copolymer, propylene-ethyl acrylate copolymer, propylene-butyl acrylate copolymer, ethylene-vinyl acetate copolymer, and propylene-vinyl acetate copolymer, as olefin polymers.

Further, examples of the base polymer include polyurethane polymers such as polyester polyurethane and polyether polyurethane; and styrene polymers such as styrene-ethylene-butylene copolymer (SEB), styrene-butadiene-styrene copolymer (SBS), hydrogenated products of SBS (styrene-ethylene-butylene-styrene copolymer (SEBS)), styrene-isoprene-styrene copolymer (SIS), hydrogenated products of SIS (styrene-ethylene-propylene-styrene copolymer (SEPS)), styrene-isobutylene-styrene copolymer (SIBS), styrene-butadiene-styrene-butadiene copolymer (SBSB), styrene-butadiene-styrene-butadiene-styrene copolymer (SBSBS), polystyrene, acrylonitrile styrene resin (AS resin), and acrylonitrile butadiene styrene resin (ABS resin), as polymers other than the olefin polymers.

Further, examples of polymers that can be employed as the base polymer in this embodiment include fluorine polymers such as fluororesin and fluororubber; polyamide polymers such as polyamide resins, e.g., polyamide 6, polyamide 11, polyamide 12, polyamide 6,6, and polyamide 610, and polyamide elastomer; polyester resins such as polyethylene terephthalate and polybutylene terephthalate; polyvinyl chloride resins; acrylic resins such as polymethylmethacrylate; silicone elastomers; butadiene rubber (BR); isoprene rubber (IR); chloroprene (CR); natural rubber (NR); styrene butadiene rubber (SBR); acrylonitrile butadiene rubber (NBR); and butyl rubber (IIR).

Among these, polyethylene is preferably used as the base polymer, in that the physical properties can be easily adjusted by the crosslinking density or the like, a decrease in physical properties due to hydrolysis is not much concerned, and the light weight of the resin itself is advantageous for reducing the weight of the polymer foam. In particular, linear low density polyethylene (LLDPE) in which ethylene monomers serving as the main component are polymerized with a-olefins such as 1-butene, 1-hexene, and 1-octene in the presence of a catalyst by a medium-to-low pressure method is suitable as the base polymer. Moreover, LLDPE in which ethylene and 1-hexene are polymerized using a single-site catalyst such as a metallocene catalyst is suitable as the base polymer because it has excellent impact resistance due to having crystals with uniform size, small lamellar, and large tie molecules, as compared to LLDPE polymerized using a multi-site catalyst such as a Ziegler-Natta catalyst.

The fibers constituting the polymer foam together with such a base polymer preferably has a length equal to or greater than the average diameter of air bubbles in a polymer foam that is generally used for shoe sole members, in order to improve the compression set properties of the polymer foam. Further, it is preferable that, in the polymer foam of this embodiment, most part of the fibers is present in spaces inside the air bubbles, and only a part of the fibers is embedded within the bubble membranes defining the air bubbles. The ratio of the embedded part with respect to the length of the fibers is preferably not more than half, more preferably not more than 20%. Specifically, the fibers preferably have an average length equal to or greater than the average diameter of the air bubbles in the polymer foam, and the average length is preferably at least 500 µm. The average length of the fibers is preferably not more than 10 mm, more preferably not more than 8 mm, particularly preferably not more than 6 mm.

Further, the average diameter of the fibers is preferably not more than 200 µm, more preferably not more than 100 µm, particularly preferably not more than 20 µm, since the fibers having smaller average diameter (diameter) can exert more significant effects of the present invention. However, excessively small average diameter of the fibers may possibly cause difficulty in dispersion of the fibers in the polymer foam and molding of the polymer foam. Therefore, the average diameter of the fibers is preferably at least 0.5 μm. The "average length" and "average diameter" of the fibers can be determined by observing the fibers in the polymer foam by an optical microscope, an electronic microscope, or transmission observation, for example, using X-ray, determining by the observation the length and diameter of a plurality (for example, about several tens) of fibers selected at random, and calculating average values of the length and diameter.

In this embodiment, even if excellent compression set properties are imparted to the polymer foam by introducing the fibers, when the rebound resilience of the polymer foam is increased simultaneously therewith, the comfort when using shoes may possibly be insufficient.

Accordingly, the fibers are preferably dispersed in the polymer foam within the range that does not affect the hardness or the like, and the fibers are preferably dispersed so that the following conditional expression (1) is satisfied:

$$H_{c1} \leq (1.1 \times H_{c0}) \tag{1},$$

where "$H_{c1}$" denotes the Asker C hardness of the aforementioned polymer foam, and "$H_{c0}$" denotes the Asker C hardness of a polymer foam formed to have the same specific gravity as the aforementioned polymer foam using the same polymer composition as the aforementioned polymer foam but not containing the fibers.

In order to prevent an increase in values of rebound resilience and hardness of the polymer foam as compared to the case of not containing the fibers, the ratio of fibers with respect to the polymer foam is preferably not more than 10 mass %, more preferably not more than 6 mass %, particularly preferably not more than 1 mass %. Further, in order to impart excellent compression set properties to the polymer foam, the ratio of fibers with respect to the polymer foam is preferably at least 0.1 mass %, particularly preferably at least 0.5 mass %.

The fibers can serve as foreign matter to the base polymer when the polymer foam is formed by foaming the polymer composition. Further, during foaming the polymer foam, in which bubble membranes composed of the polymer composition are stretched so that air bubbles grow, the fibers act to prevent formation of bubble membranes in their circumferences. As a result, the fibers are enclosed in air bubbles that are larger than their circumferences after the completion of the foaming. That is, the polymer foam of this embodiment has air bubbles inside which the fibers are present (hereinafter, referred to as "fiber-containing bubbles") and air bubbles inside which the fibers are not present (hereinafter, "fiber non-containing bubbles"). The fiber-containing bubbles are formed to be relatively larger in size as compared to the fiber non-containing bubbles. Further, a fiber is not entirely incorporated inside the space of an air bubble generally at the time of the completion of the foaming, and the fiber has both ends or a middle part in the length direction embedded in a bubble membrane, or abutting the bubble membrane from the inside. That is, the fiber is present inside a coarse bubble, for example, as a rod supporting the bubble membrane defining the coarse bubble from the inside.

Figure 2:
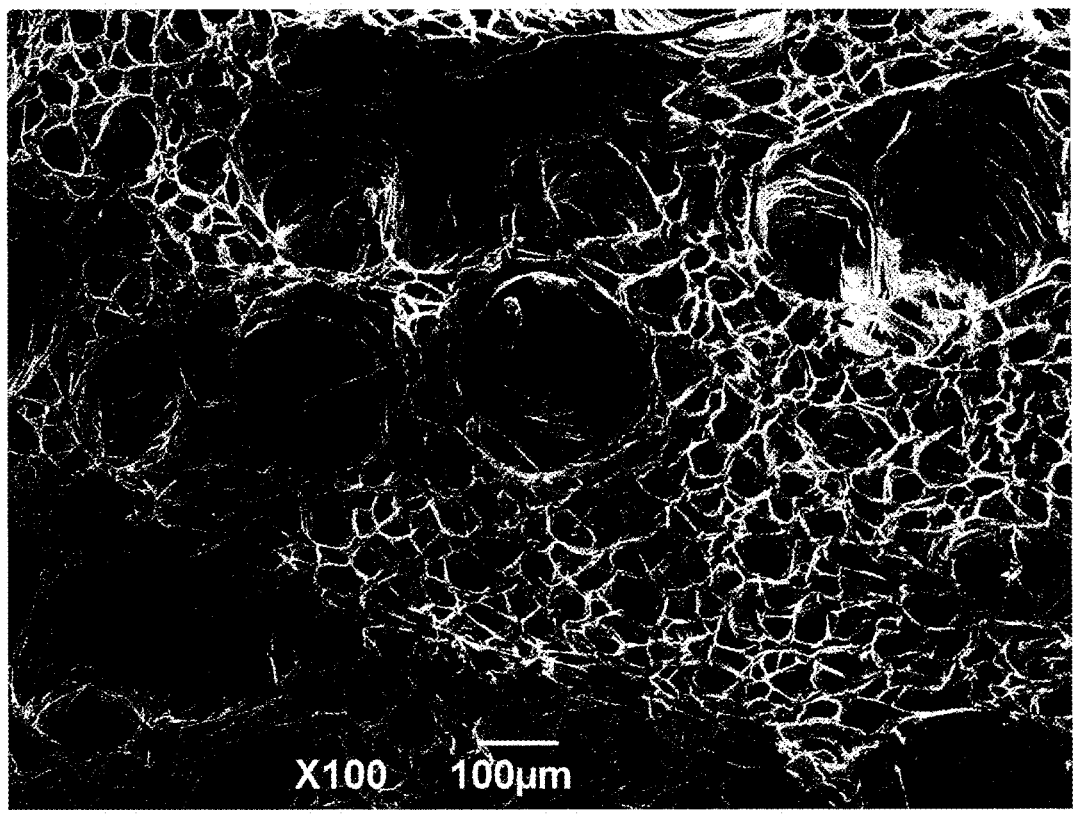
FIG. 2 is an image of a scanning electron microscope (SEM) as a result of cross sectional observation of a polymer foam in which fibers are dispersed.

The presence of the fiber-containing bubbles and the fiber non-containing bubbles can be confirmed by observing a cross section of the polymer foam, for example, using a scanning electron microscope (SEM). Further, the size relationship between the fiber-containing bubbles and the fiber non-containing bubbles also can be confirmed by observing the cross section of the polymer foam using the SEM. The confirmation can be made by selecting respective pluralities of bubbles at random from the fiber-containing bubbles and the fiber non-containing bubbles to be observed using the SEM, and comparing the average values of the cross sectional area of the selected pluralities (such as twenty) of air bubbles to each other. In this regard, a description is given with reference to FIG. 2. FIG. 2 is an SEM image of a similar product of the polymer foam No.14 in EXAMPLES. It can be seen from the SEM image that the polymer foam includes coarse air bubbles inside thereof. Further, it can be seen from the SEM image that the polymer foam has fiber-containing bubbles, since fibers are present inside two coarse air bubbles laterally aligned at the center of the image and a coarse air bubble located above the air bubble on the left side of the aforementioned two air bubbles. Although the description is not repeated below, it has been confirmed by the SEM observation that air bubbles are formed also in polymer foams other than this polymer foam, in the same manner as in FIG. 2, by dispersing fibers therein.

As described above, in the polymer foam of this embodiment, the fiber-containing bubbles that are coarse bubbles and the fiber non-containing bubble that are microbubbles coexist. Further, the polymer foam of this embodiment not only simply contains the fibers so as to utilize the recovery force against the bending of the fibers or the like for reducing the compression set, but also exhibits good recovering properties from the compressive strain by allowing the fibers to be present within relatively large air bubbles as compared to the fiber non-containing bubbles.

Although the function of the coarse bubbles associated with the effect of preventing the compression set in this regard is not sufficiently clear, assuming that the coarse bubbles and the microbubbles have a common deformation ratio (%) due to the compressive force, the coarse bubbles have a larger deformation amount (μm). In the case where the deformation amount due to the compressive force of the coarse bubbles is larger than that of the microbubbles, the coarse bubbles are required, of course, to deform more largely than the microbubbles in order to recover the original shape when the compressive force is removed. The fibers present inside the coarse bubbles are thought to be effectively used at this time for recovering the shape. That is, the fibers present inside the coarse bubbles undergo elastic deformation in the bending direction when the compressive force is applied, whereas they exert a recovery force to return to the original shape when the compressive force is removed. Therefore, the force exerted by the fibers themselves when recovering the shape can be utilized for recovering the shape of the coarse bubbles. It is thought that the polymer foam of this embodiment exerts excellent recovering properties from the compressive strain by such a reason as compared to a polymer foam simply containing the fibers.

In order to exert such effects more significantly, the following conditional expression (2) is preferably satisfied, and the following conditional expression (3) is more preferably satisfied, when the flexural modulus of the fibers at least at room temperature (25° C.) is expressed as E1 (MPa), and the flexural modulus of the polymer composition forming bubble membranes of the fiber-containing bubble at room temperature (25° C.) is expressed as E2 (MPa):

$$E_1 > E_2 \tag{2}, and$$

$$E_1 \geq (2 \times E_2) \text{ tm (3)}.$$

It is preferable that the relationship represented by the aforementioned conditional expressions (2) and (3) be satisfied not only at room temperature but also at all times in a normal operating temperature range expected for the shoe sole members. That is, the flexural modulus of the fibers is preferably always larger, particularly preferably at least twice larger, than the flexural modulus of the polymer composition, for example, in the range of 0° C. to 50° C.

Specific examples of the fibers that are preferably dispersed in the polymer foam include inorganic fibers such as carbon fibers, glass fibers, and rock wool, and organic fibers such as synthetic fibers, natural fibers, and regenerated fibers. Among these, the fibers are preferably organic fibers in that breakage is unlikely to occur during deformation such as bending, and the properties to exert a recovery force from the deformation such as bending are relatively excellent. Further, the organic fibers are preferable also in that they generally have a low specific gravity as compared to the inorganic fibers.

In the case where synthetic fibers are employed as the organic fibers, aliphatic polyamide fibers such as polyamide 6, polyamide 6,6, polyamide 11, and polyamide 12; aromatic polyamide fibers such as poly-p-phenylene terephthalamide fibers and poly-m-phenyleneisophthalamide fibers; polyolefin fibers such as polyethylene fibers and polypropylene fibers; polyester fibers such as polyethylene terephthalate fibers, polybutylene terephthalate fibers, polyethylene naphthalate fibers, polybutylene naphthalate fibers, polylactic acid fibers, and polyarylate fibers; polyphenylene sulfide fibers; polyurethane fibers; acrylic fibers; poly (p-phenylene benzobisoxazole) fibers; polyimide fibers; polyvinyl alcohol fibers; or fluororesin fibers, for example, can be employed.

In the case where natural fibers are employed as the organic fibers, cotton, hemp, silk, or wool, for example, can be employed. In the case where regenerated fibers are employed as the organic fibers, cellulose fibers, or acetate fibers and rayon fibers that are obtained by chemically treating the cellulose fibers can be employed.

Among these, aromatic polyamide fibers, polyolefin fibers, polyester fibers, polyphenylene sulfide fibers, polyurethane fibers, acrylic fibers, poly (p-penylene benzobisoxazole) fibers, polyimide fibers, polyvinyl alcohol fibers, cellulose fibers, and fluororesin fibers are suitable in that their recovery force from the deformation such as bending is excellent.

In the case where the base polymer is polyethylene such as LLDPE, fibers made of a material having low affinity to the base polymer, such as aromatic polyamide fibers and polyphenylene sulfide fibers are employed, thereby allowing the fiber-containing bubbles to be larger in size than the fiber non-containing bubbles more reliably. Further, in the case where the base polymer of the polymer foam is LLDPE, fibers made of a material having a higher flexural modulus than the base polymer, such as the aromatic polyamide fibers and the polyphenylene sulfide fibers are employed, thereby allowing the compression set properties of the polymer foam to be further excellent.

It should be noted that, even if such fibers having significant effects are employed, for example, in the case where the fibers are aligned in the thickness direction of the shoe sole members, the comfort of shoes may possibly be impaired due to a significant increase in rebound resilience (hardness improvement) following the effect of improving the compression set properties. Accordingly, the fibers are preferably dispersed in the polymer foam at random without orientation.

The polymer composition for forming the polymer foam, for example, can contain a crosslinking agent for crosslinking the base polymer. Examples of the crosslinking agent include organic peroxides, maleimide crosslinking agents, sulfur, phenolic crosslinking agents, oximes, and polyamines. Among these, organic peroxides are preferable.

Examples of the organic peroxides include dicumyl peroxide, di-t-butyl peroxide, 2,5-dimethyl-2,5-di-(t-butylperoxy) hexane, 2,5-dimethyl-2,5-di-(t-butylperoxy)hexyne-3, 1,3-bis(t-butylperoxyisopropyl)benzene, 1,1-bis (t-butylperoxy)-3,3,5-trimethylcyclohexane, n-butyl-4,4-bis (t-butylperoxy)valerate, benzoyl peroxide, p-chlorobenzoyl peroxide, 2,4-dichlorobenzoyl peroxide, t-butylperoxybenzoate, t-butylperoxyisopropyl carbonate, diacetyl peroxide, lauroyl peroxide, and t-butyl cumyl peroxide.

Further, the crosslink density of the polymer foam can be adjusted by allowing the polymer composition to contain a crosslinking aid together with the crosslinking agent. Examples of the crosslinking aid include divinyl benzene, trimethylolpropanetrimethacrylate, 1,6-hexanediol methacrylate, 1,9-nonanediol dimethacrylate, 1,10-decanediol dimethacrylate, trimellitic acid triallyl ester, triallyl isocyanate, neopentyl glycol dimethacrylate, 1,2,4-benzene tricarboxylic acid triallyl ester, tricyclodecane dimethacrylate, and polyethylene glycol diacrylate.

Examples of a foaming agent for foaming the polymer foam include azo compounds such as azodicarbonamide (ADCA), 1,1'-azobis (1-acetoxy-1-phenylethane), dimethyl-2,2'-azobisbutyrate, dimethyl-2,2'-azobisisobutyrate, 2,2'-azobis (2,4,4-trimethylpentane), 1,1'-azobis (cyclohexane-1-carbonitrile), and 2,2'-azobis [N-(2-carboxyethyl)-2-methyl-propionamidine]; nitroso compounds such as N,N'-dinitrosopentamethylenetetramine (DPT); hydrazine derivatives such as 4,4'-oxybis (benzenesulfonyl hydrazide), and diphenylsulfone-3,3'-disulfonyl hydrazide; semicarbazide compounds such as p-toluenesulfonyl semicarbazide; and thermally decomposable organic foaming agents such as trihydrazino triazine.

Further, examples of the foaming agent that can be employed include bicarbonates such as sodium hydrogen carbonate and ammonium hydrogen carbonate; carbonates such as sodium carbonate and ammonium carbonate; nitrites such as ammonium nitrite; and thermally decomposable inorganic foaming agents such as hydrogen compounds.

Further, organic foaming agents such as various aliphatic hydrocarbons, e.g., methanol, ethanol, propane, butane, pentane, and hexane, and inorganic foaming agents such as air, carbon dioxide, nitrogen, argon, and water also can be used as the foaming agent when forming the polymer foam.

Examples of other additives to be contained in the polymer composition include a dispersant, a processing aid, a weathering agent, a flame retardant, a pigment, a mold release agent, an antistatic agent, an antibacterial agent, and a deodorizer.

The method for forming the polymer foam using such a polymer composition is not specifically limited, and a conventionally known method can be employed therefor. It should be noted that an example of the shoe sole member of the present invention is described as above in this embodiment. However, the shoe sole member of the present invention is not limited to the aforementioned example. For example, the shoe sole member of the present invention may be formed using only the polymer foam described above, or may be formed using other materials such as fabrics and resin sheets in combination, within the range in which the aforementioned effects such as excellent recovering properties from compressive deformation are not significantly impaired. Further, conventionally known technical matters may be employed in the shoe sole member of the present invention, within the range in which the effects of the present invention are not significantly impaired, even if the matters are not specifically described above.

EXAMPLES

Next, the present invention is described further in detail by way of examples. However, the present invention is not limited to these examples.

The compound materials used for examinations are shown below.

LLDPE 1

Linear low density polyethylene (comonomer: 1-hexene, metallocene-catalyzed polymerization product), product name "Evolue SP 1540", manufactured by Prime Polymer Co., Ltd., with a flexural modulus of about 150 MPa

EVA 1

Ethylene-vinyl acetate copolymer (VA 10%), product name "Ultrasen 540", manufactured by TOSOH CORPORATION, with a flexural modulus of about 95 MPa

ARM 1

Aromatic polyamide fibers, with an average length of 200 µm, an average diameter of 20 µm, and a flexural modulus of about 62 GPa

ARM 2

Aromatic polyamide fibers, with an average length of 500 µm, an average diameter of 20 µm, and a flexural modulus of about 62 GPa

ARM 3

Aromatic polyamide fibers, with an average length of 1000 µm, an average diameter of 20 µm, and a flexural modulus of about 62 GPa

PPS 1

Polyphenylene sulfide fibers, with an average length of 6000 µm, an average diameter of 10 µm, and a flexural modulus of about 3 GPa

GF 1

Glass fibers, with an average length of 3000 µm, an average diameter of 20 µm, and a flexural modulus of about 72 GPa

CF 1

Carbon fibers, with an average length of 3000 µm, an average diameter of 20 µm, and a flexural modulus of about 220 GPa

PAR1

Polyarylate fibers, with an average length of 3000 µm, an average diameter of 20 µm, and a flexural modulus of about 180 GPa

PET1

Polyethylene terephthalate fibers, with an average length of 3000 µm, an average diameter of 10 µm, and a flexural modulus of about 14 GPa Other Additives Stearic acid, zinc oxide, a foaming agent (azodicarbonamide, "AC#3C-K2", manufactured by EIWA CHEMICAL IND. CO., LTD.), a crosslinking agent (dicumyl peroxide, "PERCUMYL D", manufactured by NOF CORPORATION), and a crosslinking aid (triallyl isocyanurate)

Production and Evaluation of polymer Foam

The aforementioned compound materials were mixed at ratios shown in Tables 1 to 4 below, and polymer foams having specific gravities shown in Tables 1 to 4 below were produced. Tables 1 to 4 also show measurement results of the Asker C hardness and compression set of the polymer foams.

It should be noted that the values of the flexural modulus of LLDPE 1, EVA 1, and the fibers are estimated values. More specifically, the values of the flexural modulus of LLDPE 1 and EVA 1 are estimated as equivalent values of the tensile elastic modulus, and the measured values of the tensile elastic modulus are shown. Further, literature values are shown as the values of the flexural modulus of the fibers. The tensile elastic modulus of LLDPE 1 and EVA 1 is values of the storage elastic modulus of strip-shaped samples measured in accordance with JIS K 7244-4. Those values are calculated by measuring the dynamic viscoelasticity under the following conditions.

Conditions for Measuring Tensile Elastic Modulus

Measurement device: Dynamic viscoelasticity measuring instrument, Rheogel-E4000, manufactured by UBM Co., Ltd.

Sample shape: Strip shape with a length of 33±3 mm, a width of 5±0.3 mm, and a thickness of 2±0.3 mm Measurement mode: Tensile mode of sine wave distortion Distance between chucks: 20±0.2 mm Temperature: 23° C.

Frequency: 10 Hz

Dynamic strain: 3 to 5 µm

Estimated values of the flexural modulus of the fibers and the base polymer are shown above. However, there is a difference of two or more digits between them. Therefore, even if the estimated values are different from actual values to some extent, it is highly probable that the following condition is satisfied in the polymer foams shown in Tables 1 to 4 below, when the flexural modulus of the fibers at 25° C. is expressed as $E_1$ (MPa), and the flexural modulus of polymer compositions forming bubble membranes in the polymer foams at 25° C. is expressed as $E_2$ (MPa):

$$E_1 \geq (2 \times E_2).$$

TABLE 1

| Polymer foam | No. 1 | No. 2 | No. 3 | No. 4 | No. 5 | No. 6 |
|---|---|---|---|---|---|---|
| LLDPE 1 (Parts by mass) | 100 | 100 | 100 | 100 | 100 | 100 |
| Fibers (Parts by mass) | None | None | None | None | None | None |
| Stearic acid | 1 | 1 | 1 | 1 | 1 | 1 |
| Zinc oxide | 0.5 | 0.5 | 0.5 | 0.5 | 0.5 | 0.5 |
| Foaming agent | 6 | 8 | 10 | 4 | 6 | 8 |
| Crosslinking agent | 1 | 1 | 1 | 0.7 | 0.7 | 0.7 |
| Crosslinking aid | 0.3 | 0.3 | 0.3 | 0.3 | 0.3 | 0.3 |
| Fiber content (mass %) | 0 | 0 | 0 | 0 | 0 | 0 |
| Asker C hardness (JIS K7312) | 62 | 48 | 40 | 65 | 52 | 40 |
| Specific gravity (JIS K7112) | 0.117 | 0.078 | 0.058 | 0.140 | 0.091 | 0.062 |
| Compression set (ASTMD395A)[%] | 16 | 31 | 63 | 14 | 20 | 52 |

TABLE 2

| Polymer foam | | No. 7 | No. 8 | No. 9 | No. 10 | No. 11 | No. 12 | No. 13 | No. 14 | No. 15 | No. 16 |
|---|---|---|---|---|---|---|---|---|---|---|---|
| LLDPE 1 (Parts by mass) | | 100 | 100 | 100 | 100 | 100 | 100 | 100 | 100 | 100 | 100 |
| Fibers (Parts by mass) | ARM 1 (200 μm) | 1.4 | 7.2 | | | | | | | | |
| | ARM 2 (500 μm) | | | 2.8 | 7.2 | | | | | | |
| | ARM 3 (1000 μm) | | | | | 0.72 | 0.72 | 0.72 | 0.72 | | |
| | PPS 1 (6000 μm) | | | | | | | | | 0.67 | 0.67 |
| Stearic acid | | 1 | 1 | 1 | 1 | 1 | 1 | 1 | 1 | 1 | 1 |
| Zinc oxide | | 0.5 | 0.5 | 0.5 | 0.5 | 0.5 | 0.5 | 0.5 | 0.5 | 0.5 | 0.5 |
| Foaming agent | | 5 | 6 | 7 | 8 | 5 | 6 | 7 | 8 | 6 | 7 |
| Crosslinking agent | | 0.7 | 1 | 0.7 | 1 | 0.7 | 1 | 0.7 | 1 | 0.7 | 0.7 |
| Crosslinking aid | | 0.3 | 0.3 | 0.3 | 0.3 | 0.3 | 0.3 | 0.3 | 0.3 | 0.3 | 0.3 |
| Fiber content (mass %) | | 1.3 | 5.8 | 2.4 | 5.8 | 0.7 | 0.7 | 0.6 | 0.6 | 0.6 | 0.6 |
| Asker C hardness (JIS K7312) | | 45 | 44 | 46 | 50 | 54 | 58 | 35 | 47 | 52 | 45 |
| Specific gravity (JIS K7112) | | 0.080 | 0.077 | 0.081 | 0.086 | 0.110 | 0.117 | 0.061 | 0.081 | 0.093 | 0.080 |
| Compression set (ASTMD395A)[%] | | 25 | 26 | 18 | 12 | 12 | 10 | 35 | 15 | 14 | 20 |

TABLE 3

| Polymer foam | | No. 17 | No. 18 | No. 19 | No. 20 | No. 21 | No. 22 | No. 23 | No. 24 | No. 25 |
|---|---|---|---|---|---|---|---|---|---|---|
| LLDPE 1 (Parts by mass) | | 100 | 100 | 100 | 100 | 100 | 100 | 100 | 100 | 100 |
| Fibers (Parts by mass) | GF 1 (3000 μm) | 2.5 | | | | | | | | |
| | CF 1 (3000 μm) | | 0.88 | 1.76 | 4.4 | 8.8 | 17.6 | | | |
| | PET 1 (3000 μm) | | | | | | | 0.7 | 1.4 | |
| | PAR 1 (3000 μm) | | | | | | | | | 0.7 |
| Stearic acid | | 1 | 1 | 1 | 1 | 1 | 1 | 1 | 1 | 1 |
| Zinc oxide | | 0.5 | 0.5 | 0.5 | 0.5 | 0.5 | 0.5 | 0.5 | 0.5 | 0.5 |
| Foaming agent | | 9 | 7 | 7 | 7 | 7 | 7 | 7 | 7 | 7 |
| Crosslinking agent | | 1 | 0.7 | 0.7 | 0.7 | 0.7 | 0.7 | 0.7 | 0.7 | 0.7 |
| Crosslinking aid | | 0.3 | 0.3 | 0.3 | 0.3 | 0.3 | 0.3 | 0.3 | 0.3 | 0.3 |
| Fiber content (mass %) | | 2.1 | 0.8 | 1.6 | 3.7 | 6.9 | 12.2 | 0.6 | 1.2 | 0.6 |
| Asker C hardness (JIS K7312) | | 46 | 49 | 50 | 51 | 55 | 56 | 41 | 40 | 40 |
| Specific gravity (JIS K7112) | | 0.076 | 0.083 | 0.081 | 0.087 | 0.093 | 0.104 | 0.064 | 0.060 | 0.061 |
| Compression set (ASTMD395A)[%] | | 25 | 22 | 22 | 18 | 16 | 14 | 36 | 43 | 31 |

TABLE 4

| Polymer foam | | No. 26 | No. 27 | No. 28 | No. 29 | No. 30 | No. 31 |
|---|---|---|---|---|---|---|---|
| EVA1 (Parts by mass) | | 100 | 100 | 100 | 100 | 100 | 100 |
| Fibers (Parts by mass) | ARM 1 (200 μm) | | | | 2.5 | 2.5 | 2.5 |
| Stearic acid | | 1 | 1 | 1 | 1 | 1 | 1 |
| Zinc oxide | | 0.5 | 0.5 | 0.5 | 0.5 | 0.5 | 0.5 |
| Foaming agent | | 2 | 3 | 4 | 2 | 3 | 4 |
| Crosslinking agent | | 0.6 | 0.6 | 0.6 | 0.6 | 0.6 | 0.6 |
| Fiber content (mass %) | | 0 | 0 | 0 | 1.3 | 1.3 | 1.3 |
| Asker C hardness (JIS K7312) | | 62 | 50 | 40 | 61 | 45 | 38 |
| Specific gravity (JIS K7112) | | 0.17 | 0.114 | 0.087 | 0.169 | 0.116 | 0.091 |
| Compression set (ASTMD395A)[%] | | 14 | 29 | 41 | 13 | 17 | 30 |

In the results shown above, for example, as compared to the compression set (16%) of the polymer foam No. 1 having a specific gravity of 0.117 and not containing fibers, the compression set (10%) of the polymer foam No. 12 having a similar specific gravity is significantly improved. A similar improvement effect can be seen between the polymer foams No. 2 and No. 8. Further, the effect of the present invention can be seen also in the cases (No. 26 to No. 31) where the polymer foams are formed using base polymers other than the base polymer of the polymer foam No. 1 or the like. That is, it is understood that the present invention can provide a shoe sole member exhibiting excellent recovering properties from compressive deformation applied during use.

REFERENCE SIGNS LIST

1: Shoe
3: Midsole
4: Outer sole

The invention claimed is:

1. A shoe sole member partially or entirely formed using a polymer foam that is formed by foaming a polymer composition, the polymer foam having fibers foamed therein, the polymer foam having an Asker C hardness of at least 10 and less than or equal to 80, the fibers having an average fiber length of not more than 6 mm.

2. The shoe sole member according to claim 1, wherein the fibers are organic fibers.

3. The shoe sole member according to claim 2, wherein the organic fibers are one kind selected from aromatic polyamide fibers, polyolefin fibers, polyester fibers, polyphenylene sulfide fibers, polyurethane fibers, acrylic fibers, poly (p-phenylene benzobisoxazole) fibers, polyimide fibers, polyvinyl alcohol fibers, cellulose fibers, and fluororesin fibers.

4. The shoe sole member according to claim 1, wherein the polymer foam includes (i) fiber-containing bubbles inside which the fibers are present, and (ii) fiber-non-containing bubbles inside which the fibers are not present, and wherein the fiber-containing bubbles are larger in size than the fiber-non-containing bubbles.

5. A shoe sole member partially or entirely formed using a polymer foam that is formed by foaming a polymer composition, the polymer foam having fibers foamed therein, the polymer foam having an Asker C hardness of at least 10 and less than or equal to 80, the fibers having an average fiber length of not more than 6 mm, wherein the polymer foam includes fiber-containing bubbles inside which the fibers are present, and wherein when a flexural modulus of the fibers at 25° C. is expressed as El (MPa), and a flexural modulus of the polymer composition forming bubble membranes of the fiber-containing bubbles at 25° C. is expressed as E2 (MPa), the following condition is satisfied:

$$E1 \geq (2 \times E2).$$

6. The shoe sole member according to claim 1, wherein the fibers have an average length of at least 500 μm.

7. The shoe sole member according to claim 5, wherein the fibers have an average diameter of at least 0.5 μm and not more than 200 μm.

8. The shoe sole member according to claim 1, wherein the polymer foam has a specific gravity of at least 0.01 and not more than 0.15, and the fibers are dispersed in the polymer foam so that the following condition is satisfied:

$$Hc1 \leq (1.1 \times Hc0),$$

where "Hc1" denotes an Asker C hardness of the foregoing polymer foam, and "Hc0" denotes an Asker C hardness of a polymer foam formed to have the same specific gravity as the foregoing polymer foam using the same polymer composition as the foregoing polymer foam but not containing the fibers.

9. The shoe sole member according to claim 1, wherein the shoe sole member consists essentially of a midsole.

10. The shoe sole member according to claim 1, wherein a fiber-to-polymer foam ratio is at least 0.1 mass % and less than or equal to 10 mass %.

11. The shoe sole member according to claim 1, wherein the sole member comprises at least one of a midsole and an outer sole.

12. A shoe sole member partially or entirely formed using a polymer foam that is formed by foaming a polymer composition, the polymer foam having fibers foamed therein, the polymer foam having an Asker C hardness of at least 10 and less than or equal to 80, the fibers having an average fiber length of not more than 6 mm, wherein the polymer foam includes fiber-containing bubbles inside which the fibers are present, and wherein fibers present inside the bubbles undergo elastic deformation in a bending direction.

13. A shoe sole member partially or entirely formed using a polymer foam that is formed by foaming a polymer composition, the polymer foam having fibers foamed therein, the polymer foam having an Asker C hardness of at least 10 and less than or equal to 80, the fibers having an average fiber length of not more than 6 mm, wherein the polymer foam includes fiber-containing bubbles inside which the fibers are present, and wherein the fibers present inside the bubbles work as rods supporting the bubble membrane from the inside.

14. The shoe sole member according to claim 4, wherein a majority of the fibers are inside the fiber-containing bubbles.

15. The shoe sole member according to claim 4, wherein, for the bubble-imbedded fibers, a ratio of a bubble-imbedded part with respect to a total length of the fiber is not more than 20%.

16. The shoe sole member according to claim 4, wherein the fibers preferably have an average length equal to or greater than the average diameter of the fiber-containing bubbles in the polymer foam, and the average length is at least 500 pm.

17. The shoe sole member according to claim 4, wherein the fibers prevent formation of bubble membranes about a circumference of the fiber.

18. The shoe sole member according to claim 4, wherein the fibers are enclosed in fiber-containing bubbles that are larger than the fiber circumferences.

* * * * *